United States Patent [19]

Bauer et al.

[11] Patent Number: 5,265,148
[45] Date of Patent: Nov. 23, 1993

[54] X-RAY SHEET FILM CASSETTE

[75] Inventors: Walter Bauer, Munich; Manfred Schmidt, Kirchheim; Ernst Widemann, Dachau, all of Fed. Rep. of Germany

[73] Assignee: AGFA-Gevaert Aktiengesellschaft, Leverkusen, Fed. Rep. of Germany

[21] Appl. No.: 821,985

[22] Filed: Jan. 16, 1992

[30] Foreign Application Priority Data

Feb. 16, 1991 [DE] Fed. Rep. of Germany ... 9101821[U]

[51] Int. Cl.⁵ .............................. G03B 42/04
[52] U.S. Cl. ................... 378/182; 378/185; 378/188
[58] Field of Search ............ 378/182, 183–188, 378/208

[56] References Cited

U.S. PATENT DOCUMENTS 5,086,446 2/1992 Bauer et al. ..................... 378/185

Primary Examiner—David P. Porta
Attorney, Agent, or Firm—Michael J. Striker

[57] ABSTRACT

An X-ray sheet film cassette has an upper cassette part, a lower cassette part adapted to face a radiation source and connected with the upper cassette part so that the cassette can be opened and closed. The lower cassette part has a frame and a plate connected with the frame. The plate includes an intermediate plate portion and two thin outer plate portions surrounding the intermediate plate portion. At least one of the outer plate portions extends outwardly beyond the intermediate plate portion at least at one edge of the plate and projects toward the interior of the X-ray sheet film cassette so as to form a web.

13 Claims, 5 Drawing Sheets

5,265,148

X-RAY SHEET FILM CASSETTE

BACKGROUND OF THE INVENTION

The present invention relates generally to an X-ray sheet film cassette. More particularly, it relates to an X-ray sheet film cassette which has an upper cassette part and a lower cassette part turnably connected with one another, wherein the lower cassette part includes a thick hard foam intermediate plate part and two thin, thermoplastically bonded carbon fiber outer cassette parts.

X-ray sheet film cassettes of the above mentioned general type are known in the art. One of such cassettes is disclosed, for example, in the German document DE-GMS 88 10 348. In the cassette disclosed in this reference the above mentioned sandwich plate composed of two thin, thermoplastically bonded carbon fiber plates with a thick hard foam plate therebetween, is connected to a frame by welding, adhesive or injection molding. Thereby the contact or adhesive surface between the sandwich plate and the frame which surrounds it is very low. Moreover, there is the danger that during a long use of the X-ray sheet film cassette, the glued, welded or injection molded frame can be released from the sandwich plate.

SUMMARY OF THE INVENTION

Accordingly, it is an object of the present invention to provide an X-ray sheet film cassette which avoids the disadvantages of the prior art.

In keeping with these objects and with others which will become apparent hereinafter, one feature of the present invention resides, briefly stated, in an X-ray sheet film cassette of the above mentioned type in which in the sandwich plate at least one outer plate extends outwardly beyond the intermediate plate at least at one edge of the plate and more particularly is bent upwardly toward an interior of the X-ray sheet film cassette so as to form a web.

When the X-ray sheet film cassette is designed in accordance with the present invention, the plate of the lower cassette part is connected with the surrounding frame in a stable and durable manner.

Moreover, the plate also has an increased torsion strength.

In accordance with another feature of the present invention, the outer plate part which faces toward the outer side of the X-ray sheet film cassette is bent to extend outwardly beyond the intermediate plate part to form a web.

Still another feature of the present invention is that the outer plate part which faces the inner side of the X-ray sheet film cassette is bent to extend above the intermediate plate part and to form the web.

Also, both outer plate parts can be bent to extend outwardly beyond the intermediate plate part and to form together the web.

Still a further feature of the present invention is that the second web can be provided on the plate so as to extend parallel to the first web, and the second web is arranged at the opposite edge of the plate.

The plate can be connected with the frame by welding, adhesive or formed as a one-piece integral member by injection molding.

The plate can be provided with a camber directed to the interior of the cassette.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
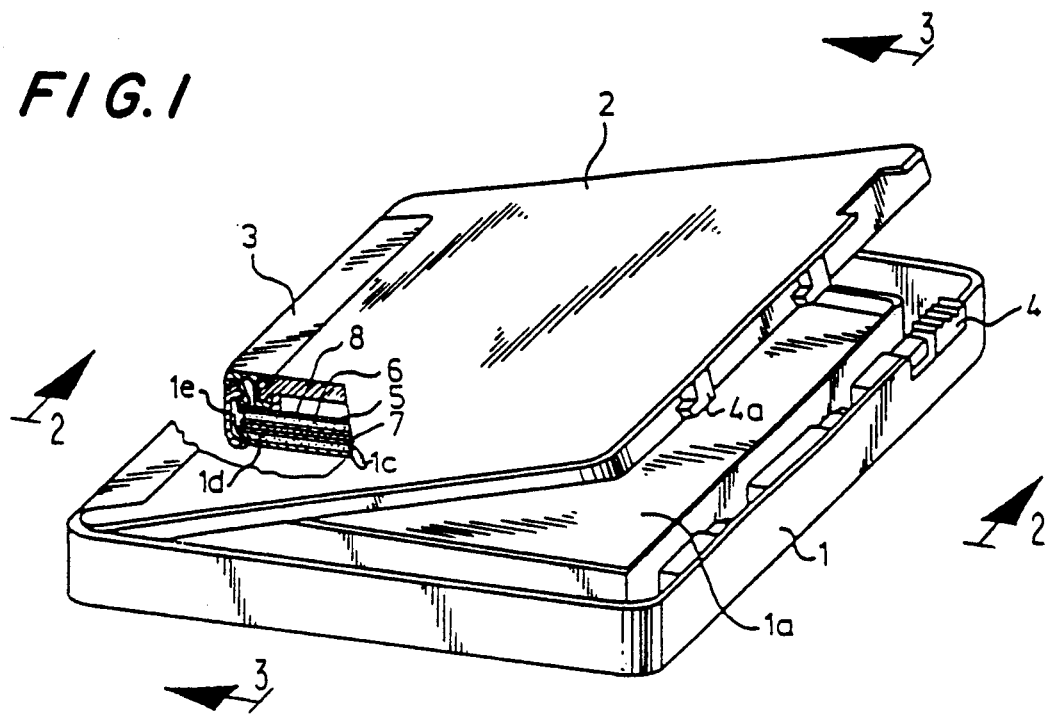
FIG. 1 is a perspective view which shows an X-ray sheet film cassette in accordance with the present invention which is open and the view is partially broken.

An X-ray sheet film cassette in accordance with the present invention includes a lower cassette part which is identified as a whole with reference numeral 1 and an upper cassette part which is identified as a whole with reference numeral 2. The lower cassette part 1 and the upper cassette part 2 are pivotally connected with one another by a hinge 3.

The cassette in accordance with the present invention further has locking elements for the upper and lower cassette parts which are identified with references 4 and 4a. The upper cassette part 2 is provided with a reinforcing web 2a. A thermoplastic plate 8 is welded to the reinforcing webs 2a. A pressing pad 6 is mounted on the thermoplastic plate 8. A reinforcing foil 5 is arranged on the pressing pad 6. An X-ray film identified with reference numeral 7 is located between the reinforcing foil 5 and the lower cassette part 1.

Figure 2:
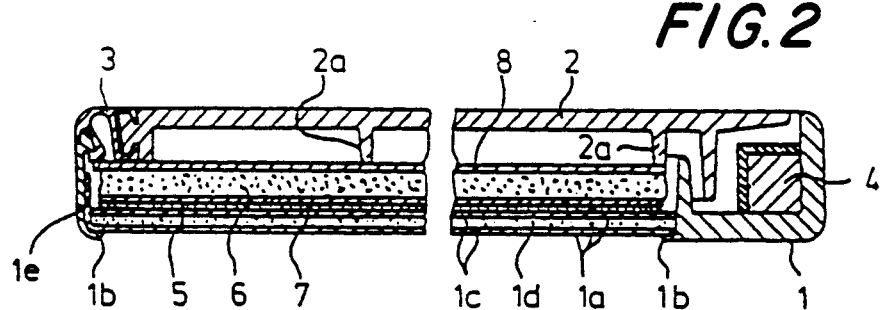
FIG. 2 is a view showing the inventive X-ray sheet film cassette in a section taken along the line II—II in FIG. 1.
Figure 3:
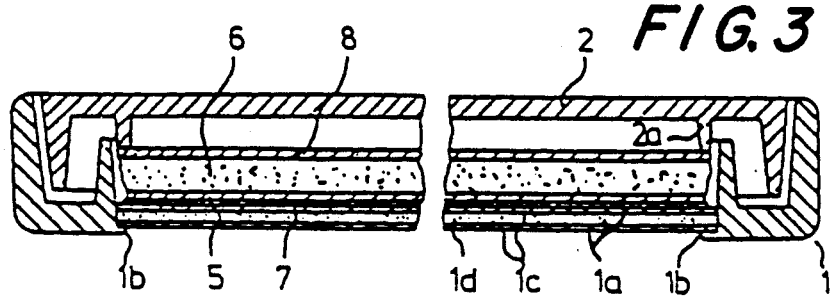
FIG. 3 is a view showing the inventive X-ray sheet film cassette in a section taken along the line III—III in FIG. 1.
Figure 6:
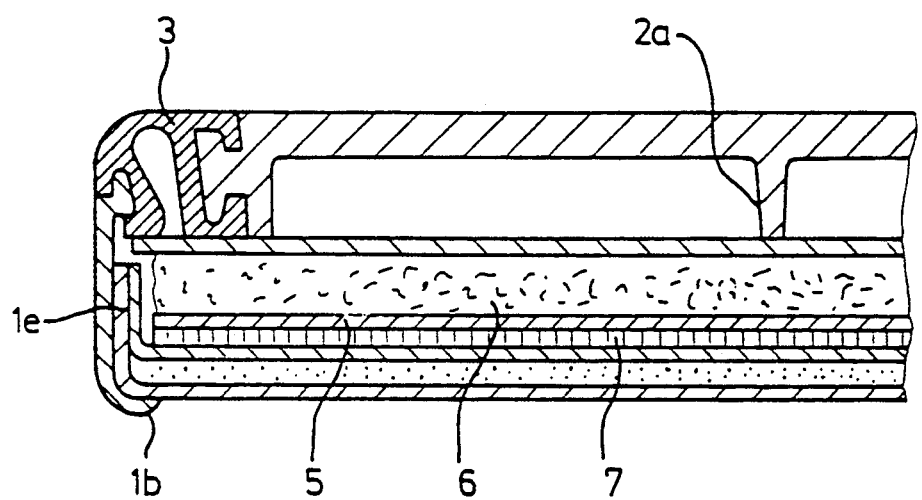
FIG. 6 is a view substantially corresponding to the view of FIG. 4, but showing still a further modification of the present invention

The novel feature of the cassette in accordance with the present invention is that it has a plate 1a which is provided at its edge with a web 1e. The plate 1a has two thermoplastically bonded carbon fiber plate parts 1c. The web 1e is formed by one of the plate parts 1c as shown in FIGS. 2 and 3 or by two plate parts 1c as shown in FIG. 6.

The plate 1a can be connected with the lower cassette part 1 by welding or glueing. The welding seams between the cassette part 1 and the plate 1a or the web 1e are identified as 1b. It is also possible to introduce the plate 1a in an injection mold for the lower cassette part 1 and to mold it together with the lower cassette part.

As can be seen from the drawings, the plate 1a has a hard foam plate part 1d which is located between the carbon fiber plate parts 1c. The important feature of the plate 1a is that at least at one of its edges one carbon fiber plate part 1c or both carbon fiber plate parts 1c extend outwardly beyond the hard foam plate part 1d, and the portion of the carbon fiber plate part or plate parts 1c which extends outwardly beyond the hard foam plate part 1d is bent upwardly or in other words toward the interior of the X-ray sheet film cassette. The thusly projecting web 1e increases the adhesive or welding surface. Thereby the connection produced between the lower cassette part or its frame 1 on the one hand and the web 1e or the plate 1a on the other hand can withstand the forces occurring during handling of the cassette.

In addition the web 1a increases the torsion strength of the X-ray sheet film cassette, without losing the advantages of the sandwich structure such as cost favorable manufacture, simple production of cambering and high transparency for X-ray radiation. Since the thermoplastically bonded carbon fiber plate parts 1c have the thickness of approximately only 0.3 mm, the wall thickness of the lower cassette part or its frame 1 is increased at the maximum only two times the thickness of the carbon fiber plate or in other words by approximately 0.6 mm. Thereby also the condition is fulfilled that the X-ray sheet film edge facing toward the hinge 3 comes as close as possible to the body of the patient.

Figure 2A:
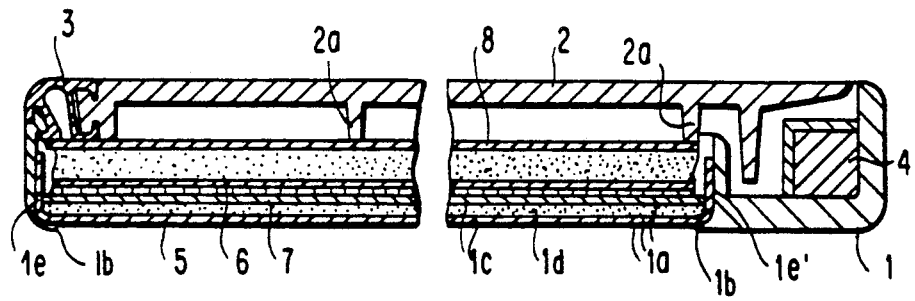
FIG. 2a corresponds to the view of FIG. 2 and shows another modification of the inventive X-ray sheet film cassette.

As can be seen from FIG. 2a, two webs can be provided at opposite edges of the carbon fiber plate part 1c. The webs are identified as 1e and 1e' and extend outwardly beyond the hard foam plate part 1d at its opposite sides and are bent upwardly toward the interior of the X-ray sheet film cassette.

Figure 7B:
FIGS. 7a–7c show a further modification of the invention.
Figure 7C:
Figure 7A:
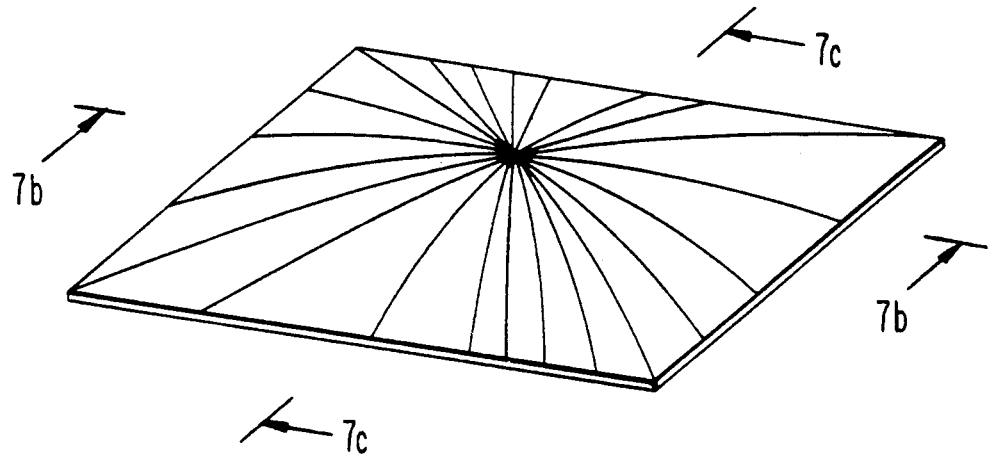
Figure 4:
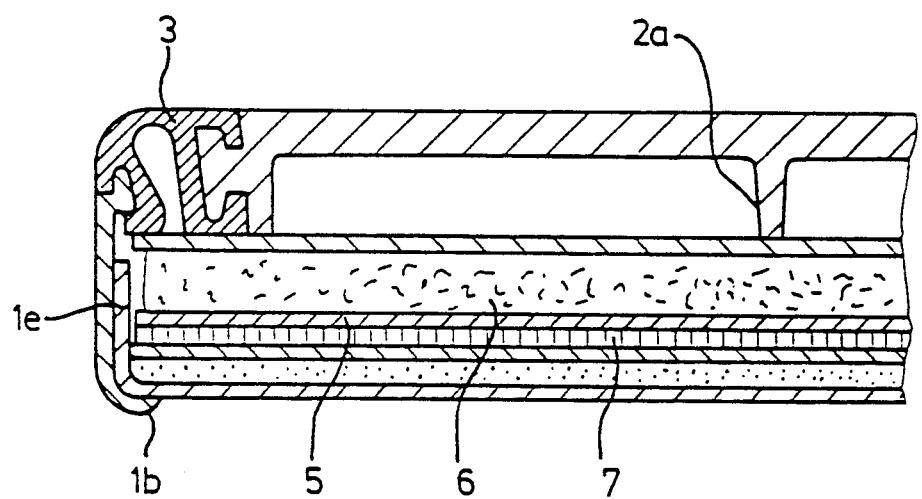
FIG. 4 is a view showing a portion of the inventive X-ray sheet film cassette of FIG. 1 on an enlarged scale in accordance with one modification of the present invention.
Figure 5:
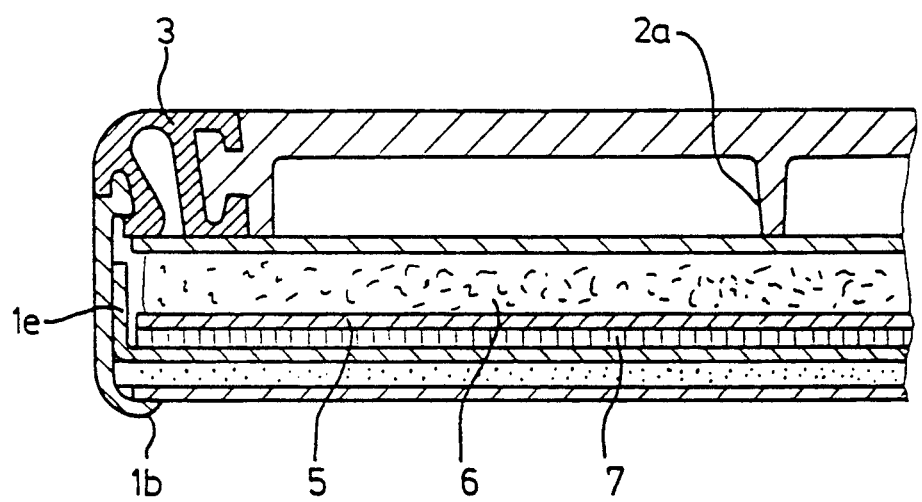
FIG. 5 is a view substantially corresponding to the view of FIG. 4 but showing another modification of the present invention.

As can be seen from FIG. 7a the plates have a camber or bulging directed toward an interior of the cassette. Section I—I and II—II are shown in FIGS. 7b and 7c.

It will be understood that each of the elements described above, or two or more together, may also find a useful application in other types of constructions differing from the types described above.

While the invention has been illustrated and described as embodied in an X-ray sheet film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An X-ray sheet film cassette, comprising an upper cassette part; a lower cassette part adapted to face a radiation source and connected with said upper cassette part so that the cassette can be opened and closed, said lower cassette part having a frame and a plate connected with said frame, said plate including an intermediate plate portion and two outer plate portions surrounding said intermediate plate portion, at least one of said outer plate portions extending outwardly beyond said intermediate plate portion at least at one edge of said plate and projecting toward the interior of the X-ray sheet film cassette so as to form a web.

2. An X-ray sheet film cassette as defined in claim 1, wherein said lower cassette part and said upper cassette part are turnably connected with one another; and further comprising means for turnable connecting said cassette parts with one another.

3. An X-ray sheet film cassette as defined in claim 1, wherein said upper cassette part and said lower cassette part are lockable with one another; and further comprising means for locking said cassette parts with one another.

4. An X-ray sheet film cassette as defined in claim 1, wherein said intermediate plate part is composed of a foam material, said outer plate parts being composed of thin, thermoplastically bonded carbon fiber material.

5. An X-ray sheet film cassette as defined in claim 1, wherein said outer plate parts include a first outer plate part which faces an outer side of the X-ray sheet film cassette, said cassette parts being connected with one another at one edge, said one outer plate part having an edge extending parallel to said one edge above said intermediate plate part and bent toward the interior of the cassette so as to form said web.

6. An X-ray sheet film cassette as defined in claim 1, wherein another of said outer outer plate portions faces an inner side of the X-ray sheet film cassette, said cassette parts being connected with one another outer at one edge, said another plate portions having an edge which extends parallel to said one edge above said intermediate plate and is bent toward the interior of the cassette so as to form said web.

7. An X-ray sheet film cassette as defined in claim 1, wherein both said outer plate parts extend outwardly beyond said intermediate plate part and are bent toward the interior of the cassette to form said web.

8. An X-ray sheet film cassette as defined in claim 7, wherein said cassette parts are connected with one another at one edge, said both outer plate parts being bent at their edges extending parallel to said one edge.

9. An X-ray sheet film cassette as defined in claim 1, wherein said plate has a second such web which extends parallel to said first mentioned web at an edge of said plate which is opposite to said first mentioned edge of said plate.

10. An X-ray sheet film cassette as defined in claim 1; and further comprising means for connecting said plate with said frame and including welding means.

11. An X-ray sheet film cassette as defined in claim 1; and further comprising means for connecting said plate with said frame and including adhesive means.

12. An X-ray sheet film cassette as defined in claim 1, wherein said plate and said frame are formed as an integral one-piece injection molded element.

13. An X-ray sheet film cassette as defined in claim 1, wherein said plate has a bulging directed toward an interior of the cassette.

* * * * *